United States Patent
Siddiqui

(10) Patent No.: US 9,803,075 B2
(45) Date of Patent: Oct. 31, 2017

(54) POLYPROPYLENE-ASPHALTENE COMPOSITE AND METHODS THEREOF

(71) Applicant: King Fahd University of Petroleum and Minerals, Dhahran (SA)

(72) Inventor: Mohammad N. Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 152 days.

(21) Appl. No.: 14/980,652

(22) Filed: Dec. 28, 2015

(65) Prior Publication Data

US 2017/0183487 A1    Jun. 29, 2017

(51) Int. Cl.

| | |
|---|---|
| *C08L 23/10* | (2006.01) |
| *C08L 25/06* | (2006.01) |
| *C08L 95/00* | (2006.01) |
| *C10C 3/00* | (2006.01) |
| *C08L 23/12* | (2006.01) |

(52) U.S. Cl.
CPC .................................. *C08L 23/10* (2013.01)

(58) Field of Classification Search
CPC .......... C08L 23/10; C08L 23/12; C08L 95/00; C10C 3/005
USPC ........................................................... 524/64
See application file for complete search history.

(56) References Cited

U.S. PATENT DOCUMENTS

| | | | |
|---|---|---|---|
| 8,404,037 B2* | 3/2013 | Naidoo ................... | C08L 95/00 106/273.1 |
| 2005/0231892 A1* | 10/2005 | Harvey .................. | H01G 9/155 361/502 |
| 2006/0148939 A1* | 7/2006 | Pinto ...................... | C09K 21/14 524/59 |

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

A composite comprising polypropylene and a filler, which comprises asphaltenes extracted from Arabian Heavy crude oil. The composite comprises 90-98 wt % of the polypropylene polymer and 2 wt % to less than 10 wt % of the filler, where the weight percentages are based on a total weight of the composite. A melt-blending method is used to prepare the composites. A material comprising the composite is disclosed.

18 Claims, 12 Drawing Sheets

POLYPROPYLENE-ASPHALTENE COMPOSITE AND METHODS THEREOF

STATEMENT OF ACKNOWLEDGEMENT

The inventors acknowledge the support provided by the Deanship of Scientific Research (DSR) at King Fahd University of Petroleum & Minerals (KFUPM), Dhahran, Saudi Arabia, for funding this project through project number SB131006.

BACKGROUND OF THE INVENTION

Technical Field

The present invention is broadly concerned with polypropylene polymer composites comprising asphaltenes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polypropylene (PP) is one of the fastest growing polymers among thermoplastics. This growth is ascribed to its appealing combination of low cost, good processability, low weight and tunable properties. These properties resulted in PP being employed in a wide variety of applications such as the automotive industry for interior trims, instrument panels, food packaging, stationery, plastic parts, textiles and others. It can be also formed into fibers, which have low absorbance and high strain resistance, for clothing and home furnishing, especially carpeting. Polypropylene is a polymorphic material with several possible modifications: the monoclinic (α-modification), the trigonal (β-modification) and the orthorhombic (γ-modification) (A. T. Jones, J. M. Aizlewood, D. R. Beckett. Crystalline forms of isotactic polypropylene. Makromol. Chem. 75 (1964) 134-158, incorporated herein by reference in its entirety). The α-form of PP is the most stable thermodynamically and for this reason, the majority of the commercial grades of PP crystallize essentially in the monoclinic system. In order to improve the properties of PP to match the profile of a typical engineering thermoplastic, proper fillers or reinforcements are incorporated into the PP matrix (J. Karger-Kocsis, Ed. Polypropylene structure, blends and composites-Composites; Chapman & Hall: London, 1995; Vol. 3, incorporated herein by reference in its entirety). Thus, composites of PP with a number of fillers have been prepared and studied in literature (G. Tartaglione, D. Tabuani, G. Camino, M. Moisio. PP and PBT composites filled with sepiolite: Morphology and thermal behaviour. Compos. Sci. Technol. 68 (2008) 451-460; P. Peng, Z. Yang, M. Wu, Q. Zhang, G. Chen. Effect of montmorillonite modification and maleic anhydride-grafted PP on the microstructure and mechanical properties of PP/MMT nanocomposites. J. Appl. Polym. Sci. 130 (2013) 3952-3960; J. H. Joo, J. H. Shim, J. H. Choi, C.-H. Choi, D.-S. Kim, J.-S. Yoon. The effect of the silane modification of an organoclay on the properties of polypropylene/clay composites. J. Appl. Polym. Sci. 109 (2008) 3645-3650; N. A. Rahman, A. Hassan, R. Yahya, R. A. Lafia-Araga, P. Hornsby. Micro-structural, thermal and mechanical properties of injection-molded glass fiber/nanoclay/polypropylene composites. J. Rein. Plast. Compos. 31 (2012) 269-281; H. Lee, D. S. Kim Preparation and physical properties of wood/polypropylene/clay nanocomposites. J. Appl. Polym. Sci. 111 (2009) 2769-2776; Z. T. Yao, T. Chen, H. Y. Li, M. S. Xia, Y. Ye, H. Zheng. Mechanical and thermal properties of polypropylene composites filled with modified shell waste. J. Hazard. Mater. 262 (2013) 212-217; Z. Lin, Z. Guan, C. Chen, L. Cao, Y. Wang, S. Gao, B. Xu, W. Li. Preparation, structures and properties of shell/polypropylene biocomposites. Thermochim. Acta 551 (2013) 149-154, each incorporated herein by reference in their entirety).

Tartaglione et al. studied the morphology and thermal behavior of PP composites filled with pristine or organo-modified sepiolite (G. Tartaglione, D. Tabuani, G. Camino, M. Moisio. PP and PBT composites filled with sepiolite: Morphology and thermal behaviour. Compos. Sci. Technol. 68 (2008) 451-460, incorporated herein by reference in its entirety). The effect of montmorillonite (MMT) modification and maleic anhydride-grafted PP on the microstructure and mechanical properties of PP/MMT nanocomposites was investigated by Peng et al. (P. Peng, Z. Yang, M. Wu, Q. Zhang, G. Chen. Effect of montmorillonite modification and maleic anhydride-grafted PP on the microstructure and mechanical properties of PP/MMT nanocomposites. J. Appl. Polym. Sci. 130 (2013) 3952-3960—incorporated herein by reference in its entirety). It was found that the highly dispersed MMT in PP matrix increased the number of spherulite crystals, enhanced the melting enthalpy and improved the thermal stability. The effect of the silane modification of an organoclay on the properties of polypropylene/clay composites was further investigated by Joo et al. (J. H. Joo, J. H. Shim, J. H. Choi, C.-H. Choi, D.-S. Kim, J.-S. Yoon. The effect of the silane modification of an organoclay on the properties of polypropylene/clay composites. J. Appl. Polym. Sci. 109 (2008) 3645-3650—incorporated herein by reference in its entirety). These composites were found to possess good tensile properties. Hybrid composites of PP with glass fiber and nanoclay were prepared by Rahman et al., and their microstructural, thermal and mechanical properties were studied (N. A. Rahman, A. Hassan, R. Yahya, R. A. Lafia-Araga, P. Hornsby. Micro-structural, thermal and mechanical properties of injection-molded glass fiber/nanoclay/polypropylene composites. J. Rein. Plast. Compos. 31 (2012) 269-281, incorporated herein by reference in its entirety). It was found that the thermal stability of the material improved, as well as the flexural strength and the modulus of the material.

Nanocomposites of PP with wood and an organomodified clay were prepared by Lee and Kim (H. Lee, D. S. Kim Preparation and physical properties of wood/polypropylene/clay nanocomposites. J. Appl. Polym. Sci. 111 (2009) 2769-2776, incorporated herein by reference in its entirety). The performance of the wood/PP composites was improved by the incorporation of the nanoclay.

Calcium carbonate is the most widely used inorganic filler in polymers. Yao et al. used it to form PP composites (Z. T. Yao, T. Chen, H. Y. Li, M. S. Xia, Y. Ye, H. Zheng. Mechanical and thermal properties of polypropylene composites filled with modified shell waste. J. Hazard. Mater. 262 (2013) 212-217, incorporated herein by reference in its entirety). The mechanical properties and the thermal stability of the materials formed were significantly improved compared to pristine PP, and the maximum amount of the filler was found to be around 15%. Biocomposites of shells with PP were also prepared by Lin et al. and results showed that modified shells were n-nucleating agents in the crystallization of PP (Lin, Z. Guan, C. Chen, L. Cao, Y. Wang, S. Gao, B. Xu, W. Li. Preparation, structures and properties of shell/polypropylene biocomposites. Thermochim. Acta 551 (2013) 149-154, incorporated herein by reference in its entirety).

In the petroleum refining industry, pyrolysis and/or hydrocracking processes convert heavy petroleum oils and high-boiling residues to more valuable lower-boiling products, such as gasoline and diesel oil. The feedstock contains a significant amount of asphaltenes, which are high molecular weight, polycondensed aromatic compounds bearing long aliphatic hydrocarbon chains. Heavy crude oils contain higher proportions of asphaltenes than do medium or light oils. Asphaltenes contain mainly carbon and hydrogen atoms in the form of highly complex structures that is not known accurately yet (M. N. Siddiqui, Alkylation and Oxidation Reactions of Arabian Asphaltenes, Fuel, 82(11) (2003) 1323-1329, incorporated herein by reference in its entirety).

In view of the foregoing, the objective of the present disclosure is to provide a polymer composite comprising asphaltenes. It is a further objective to present an application of a by-product of the petroleum refining industry in manufacturing polymer composites with enhanced thermal and mechanical properties.

BRIEF SUMMARY OF THE INVENTION

According to a first aspect, the present disclosure relates to a polypropylene-asphaltene composite, comprising a polypropylene polymer in an amount ranging from 85-98 wt %, and a filler in an amount ranging from 2 wt % to less than 10 wt %, wherein the filler is an asphaltene, and the weight percentages are based on a total weight of the composite.

In one embodiment, the composite consists essentially of the polypropylene polymer in an amount ranging from about 90-98 wt %, and the filler in an amount ranging from 2 wt % to less than 10 wt %, wherein the filler is an asphaltene, which is the only filler present, and the weight percentages are based on a total weight of the composite.

In another embodiment, the composite consists of the polypropylene polymer in an amount ranging from about 90-98 wt %, and the filler in an amount ranging from 2 wt % to less than 10 wt %, wherein the filler is an asphaltene, which is the only filler present, and the weight percentages are based on a total weight of the composite.

In another embodiment, asphaltene is present in an amount ranging from 2 wt % to less than 10 wt % of the total weight of the composite.

In another embodiment, asphaltene is present in an amount ranging from 2 wt % to 7.5 wt % of the total weight of the composite.

In another embodiment, the composite is in the form of a particle with a largest average diameter ranging from 0.5-5 μm.

In another embodiment, the composite has a peak melting temperature ranging from 165-175° C. and a degree of crystallinity ranging from more than 35% to 40%.

In another embodiment, the composite has a tensile strength ranging from 22-30 MPa.

In another embodiment, the composite has an elastic modulus ranging from 520-710 MPa.

In another embodiment, the asphaltene is extracted from Arabian Heavy crude oil.

In another embodiment, the asphaltene comprises carbon atoms in an amount ranging from 83-84 wt %, hydrogen atoms in an amount ranging from 8.2-8.4 wt %, nickel in an amount ranging from 18-20 ppm and vanadium in an amount ranging from 59-61 ppm, where the weight percentages and ppm levels are based on a total weight of the asphaltene, and the asphaltene has a molecular weight in a range of 1800-1900 Daltons.

According to a second aspect, the present disclosure relates to a method of preparing a polypropylene-asphaltene composite, comprising (i) melting a polypropylene polymer to obtain a molten polymer, (ii) blending the molten polymer with a filler to obtain a blended mixture, and (iii) hot pressing the blended mixture to obtain the composite, wherein the polypropylene polymer is present in an amount ranging from 85-98 wt %, the filler is present in an amount ranging from 2 wt % to less than 10 wt %, the weight percentages are based on a total weight of the composite, and the filler comprises asphaltene.

In some embodiments, the blending is performed at a rotor speed of 50 to 100 rpm and at a temperature in a range of 180-210° C.

In some embodiments, the hot pressing is performed at a temperature in a range of 180-210° C. and a pressure in a range of 8-20 MPa.

According to a third aspect, the present disclosure relates to a material comprising a polypropylene-asphaltene composite, wherein the material is employed in a packaging material, a textile or both, and the polypropylene-asphaltene composite comprises a polypropylene polymer in an amount ranging from 85-98 wt %, and a filler in an amount ranging from 2 wt % to less than 10 wt %, wherein the filler is an asphaltene, which is the only filler present, and the weight percentages are based on a total weight of the composite.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
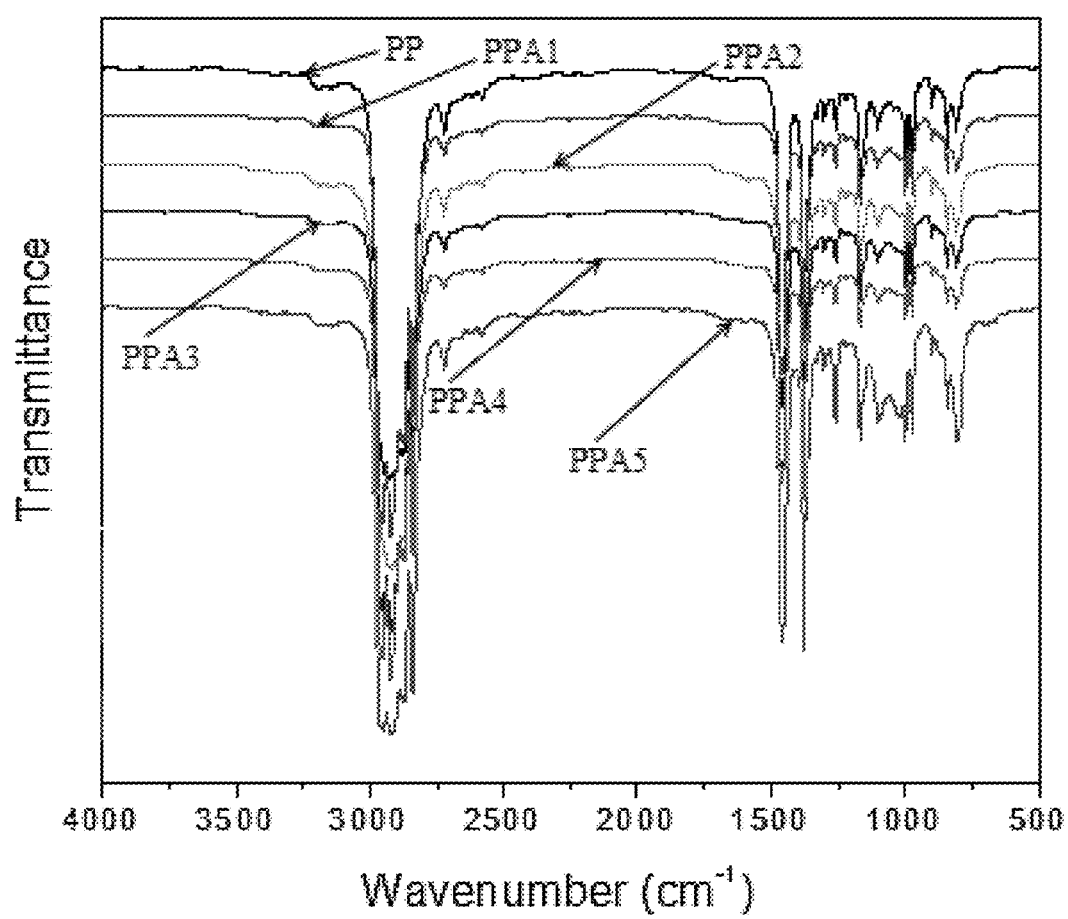
FIG. 1 shows an overlay of the FITR spectra of polypropylene and the composites, which have their sample codes listed in Table 2.

Embodiments of the present disclosure will now be described more fully hereinafter with reference to the accompanying drawings, in which some, but not all embodiments of the disclosure are shown.

According to a first aspect, the present disclosure relates to a polypropylene-asphaltene composite, comprising a polypropylene polymer in an amount ranging from 85-98 wt %, based on a total weight of the composite. In a preferred embodiment, the amount of polypropylene polymer ranges from 90-98 wt %, preferably 92-98 wt %, more preferably 94-98 wt %. The composite further comprises a filler in an amount ranging from 2 wt % to less than 10 wt %, and the filler is an asphaltene. The polypropylene polymer may interact with the filler via covalent or electrostatic forces. In a preferred embodiment, the polypropylene polymer interacts with the filler with van der Waals forces. The asphaltenes may be physically dispersed (i.e., no chemical reactions between the asphaltenes and the polymer) within that polypropylene matrix, chemically reacted with the polypropylene, or a combination of both. Preferably, the asphaltenes are homogeneously dispersed within the polymer matrix and may disrupt intermolecular interactions between polymer chains. The asphaltenes contain hydrocarbon chains that may interact with the C—C backbone of polypropylene or the methyls of polypropylene via van der Waals interactions.

The composites can also comprise other ingredients. For example, a polymerization catalyst may be used during formation of the polymer-composite, and the catalysts may remain in the composite. Non-limiting examples of catalysts include Ziegler-Natta catalysts, titanium oxide residues, and metallocenes. Other non-limiting examples of ingredients that may be present include plasticizers, process aids, accelerators, modifiers, processing oils, pigments and dyes, extenders and mixtures thereof. Non-limiting examples of components in fillers include inorganic oxides (e.g. aluminum oxide and magnesium oxide), inorganic hydroxides, inorganic salts (e.g. calcium carbonate), silicates (e.g. talc), metals, carbon, fibers (e.g. milled glass fiber) and silica (e.g. fumed silica powder). In a preferred embodiment, the fillers, such as inorganic oxides, inorganic hydroxides, inorganic salts, silicates, metals, fibers and silica, are excluded from the polypropylene-asphaltene composite.

In one embodiment, the composite consists essentially of a polypropylene polymer in an amount ranging from about 90-98 wt %, and a filler in an amount ranging from 2 wt % to less than 10 wt %, wherein the filler is an asphaltene, and the weight percentages are based on a total weight of the composite.

In another embodiment, the composite consists of a polypropylene polymer in an amount ranging from about 90-98 wt %, and a filler in an amount ranging from 2 wt % to less than 10 wt %, wherein the filler is an asphaltene, and the weight percentages are based on a total weight of the composite.

In a preferred embodiment, asphaltene is the only filler present. In most embodiments, asphaltene is present in an amount ranging from 2 wt % to less than 10 wt % of the total weight of the composite, preferably 2-9.95 wt %, more preferably 2-9.5 wt %, more preferably 2-8.5 wt %, more preferably 2-7.5 wt %, more preferably 2-6 wt %, preferably 2-5.0 wt %, preferably 2-2.5 wt %.

In most embodiments, the composite is in the form of a particle. The shape of the particle includes, but is not limited to, a sphere, a spheroid, a cube, a cuboid, a rod, a fiber, a flake, a plate and a polygon. Preferably, the particle has an irregular shape and a largest average diameter ranging from 0.1-5 μm, preferably 0.1-4 μm, preferably 0.1-2.5 μm, and more preferably 0.1-1 μm. For particles with a polygonal shape, the term "diameter", as used herein, and unless otherwise specified, refers to the greatest possible distance measured from a vertex of a polygon through the center of the face to the vertex on the opposite side. For spheres, spheroids and irregular-shaped particles, "diameter" refers to the greatest possible distance measured from one point on the particle through the center of the particle to a point directly across from it.

In some embodiments, the composite has a peak melting temperature ranging from 165-175° C., preferably 166-170° C., more preferably 166-168° C., and a degree of crystallinity in a range of more than 35% to 40%, preferably 35.1-39%, more preferably 35.1-38.5%. In a preferred embodiment, the composites have an amount of asphaltenes ranging from 2.5-7.5 wt % and a peak melting temperature in a range of 166.6-167.3° C. In a preferred embodiment, the composites have an amount of asphaltenes ranging from 2.5-5 wt % and a degree of crystallinity in a range of 36.2-36.6%. In a preferred embodiment, the composites have an amount of asphaltenes of about 5 wt % and a degree of crystallinity of about 36.6%.

In most embodiments, the composite has a tensile strength in the range of 22-30 MPa, preferably 23-29.5 MPa, more preferably 24-29.5 MPa, and an elastic modulus ranging from 520-710 MPa, preferably 550-660 MPa, more preferably 580-660 MPa. In a preferred embodiment, the composites have an amount of asphaltenes ranging from 2.5-5 wt %, a tensile strength ranging from 26-29.5 MPa, and an elastic modulus ranging from 630-660 MPa. In a preferred embodiment, the composites have an amount of asphaltenes of about 5 wt %, a tensile strength of about 28.3 MPa, and an elastic modulus of about 656 MPa.

In most embodiments, the polypropylene polymer has a degree of crystallinity ranging from 30-36%, preferably 32-36%, more preferably 34-36%. The molecular weight of the polypropylene may range from 10,000 to 300,000, preferably 50,000 to 200,000, more preferably 75,000 to 150,000. Low density or high density polypropylene may be used. The tacticity of the polypropylene polymer may be syndiotactic, atactic, or preferably, isotactic. As used herein, the term "tacticity" refers to the relative orientation of each methyl group in the repeating unit of polypropylene polymer relative to the methyl groups in neighboring monomer units. In isotactic polypropylene all the methyls are located on the same side of the polypropylene backbone. In syndiotactic polypropylene, the methyls have alternate positions along the chain. In atactic polypropylene, the methyls are placed randomly along the chain. Tacticity may be measured directly using proton or carbon-13 NMR, x-ray powder diffraction, secondary ion mass spectrometry (SIMS), vibrational spectroscopy (FTIR) and especially two-dimensional techniques. Tacticity may also be inferred by measuring another physical property, such as melting temperature, when the relationship between tacticity and that property is well-established.

The polypropylene polymer may be a homopolymer (i.e. a polymer that contain only a single type of repeat unit), a random copolymer, or a block copolymer. In a preferred embodiment, the polypropylene polymer is a homopolymer. A copolymer is a polymer containing a mixture of repeat units. For example, the copolymer may contain propylene and ethylene repeating units. In one embodiment, the amount of ethylene is less than 50 wt %, based on a total weight of the copolymer.

Asphalt is a crude and inexpensive material, and is a by-product of petroleum refining. Asphaltenes are a distinct chemical component of asphalt, and impart high viscosity to crude oils, negatively impacting production. In general, asphaltenes are organic compounds which are large, planar, aromatic, contain hetero-atoms and participate in pi-pi stacking. Asphaltenes can be isolated based on solubility by solvent extraction and other methods. The asphaltenes are insoluble in low-boiling saturated hydrocarbons, such as petroleum naphtha, pentane and hexane, but are soluble in carbon tetrachloride and carbon disulfide. Asphaltenes are usually separated from the solvent in the form of a coarse brown-black powder having essentially no cohesiveness.

Asphaltenes contain varying amounts of oxygen, sulfur, and nitrogen, and have a low hydrogen-to-carbon ratio, which indicates a strongly aromatic nature (benzene has a ratio of about 1.0 and naphthalene about 0.8). The hydrogen-to-carbon ratio ranges from about 0.70 to about 1.20 depending on the source of the original asphalt. Preferred asphaltenes have a hydrogen-to-carbon atomic ratio (as determined by elemental analysis) ranging from 1.1-1.2, preferably 1.15-1.2, more preferably 1.18-1.19. Asphaltenes contain several metals in ppm levels, however, vanadium and nickel are the most important metals from the industrial point of view. The non-porphyrin vanadium and nickel occupy either heteroatoms (N, S and O) bonded sites or are strongly associated with the aromatic sheets of asphaltenes via $\pi$-$\pi$ bonding in metalloporphyrin.

The asphaltenes employed in the present disclosure may be extracted from Arabian Heavy crude oil, Arabian Medium crude oil, or Arabian Light crude oil. Preferably, the asphaltenes are extracted from Arabian Heavy crude oil. Compared to asphaltenes obtained from other sources, Arabian Heavy asphaltenes have a relatively low gravity (e.g. about 27.9° API), a high sulfur content, and a high paraffinic wax content. The asphaltenes have an average molecular weight (Mw), determined by gel permeation chromatography, ranging from 1700-2000, preferably 1750-1900, more preferably 1800-1900. Furthermore, preferred asphaltenes have a hydrogen-to-carbon atomic ratio (as determined by elemental analysis) ranging from 1.1-1.2, preferably 1.15-1.2, more preferably 1.18-1.19. Preferred asphaltenes comprise carbon atoms in an amount ranging from 80-85 wt %, preferably 82-84 wt %, more preferably 83-84 wt %, based on a total weight of the asphaltenes, 60-70 wt % aliphatic carbon atoms, preferably 62-65 wt %, more preferably 63-65 wt %, based on a total weight of the carbon atoms present in asphaltenes, and 30-40 wt % aromatic carbon atoms, preferably 35-38 wt %, more preferably 35-37 wt %, based on the total weight of the carbon atoms present in asphaltenes. Preferred asphaltenes also comprise hydrogen atoms in an amount ranging from 8-9 wt %, preferably 8.2-8.5 wt %, more preferably 8.2-8.4 wt %, based on the total weight of asphaltenes, 90-95 wt % hydrogen atoms attached to aliphatic carbons, preferably 91-94 wt %, more preferably 91-92 wt %, based on a total weight of hydrogen atoms present in asphaltenes, and 5-10 wt % hydrogen atoms attached to aromatic carbons, preferably 6-9 wt %, more preferably 8-9 wt %, based on the total weight of hydrogen atoms present in the asphaltenes. Preferred asphaltenes have a nickel content ranging from 10-30 ppm, preferably 15-20 ppm, more preferably 18-20 ppm, and a vanadium content ranging from 40-70 ppm, preferably 50-65 ppm, more preferably 59-61 ppm.

In a preferred embodiment, unfunctionalized asphaltenes are used.

According to a second aspect, the present disclosure relates to a method of preparing a polypropylene-asphaltene composite, comprising (i) melting the polypropylene polymer to obtain a molten polymer at a temperature ranging from 180-210° C., preferably 185-205° C., more preferably 185-195° C., (ii) blending the molten polymer with a filler comprising asphaltene to obtain a blended mixture at 50 to 100 rpm, preferably 55-80 rpm, more preferably 55-65 rpm and (iii) hot pressing the blended mixture at a temperature ranging from 180-210° C., preferably 185-205° C., more preferably 195-205° C. and a pressure ranging from 8-20 MPa, preferably 8-15 MPa, more preferably 8-10 MPa to obtain the composite. The blended mixture may also be pelletized with a pelletizer such as a strand pelletizer and a die-face cutter. More non-limiting examples of processes for forming and shaping the composite may be employed and include extrusion molding, rotational molding, compression molding, injection molding, casting and thermoforming.

The polypropylene polymer may be dried with dryers prior to processing. Non-limiting examples of dryers include dehumidifying dryers, rotary wheel dryers, low pressure dryers and vacuum dryers.

Preferably, unfunctionalized asphaltenes are employed in the process.

After the composite has cooled in the mold, the composite may be trimmed, smoothed, painted and/or electroplated.

In another embodiment, the composite may be formed by mixing asphaltenes with propylene monomers, which are then polymerized to form the asphaltene-polypropylene composite. For example, asphaltenes may be mixed with liquid propylene, in the presence of a catalyst and preferably in the absence of a solvent, at a temperature ranging from 60-90° C., preferably 65-85° C., more preferably 70-80° C., and a pressure ranging from 2-5 MPa, preferably 2-4 MPa, more preferably 3-4 MPa. Non-limiting examples of catalysts include the Ziegler-Natta catalysts and metallocenes having an iron or zirconium core. In an embodiment, ethylene monomers are added to the propylene monomers to form a copolymer comprising not more than 50 wt % ethylene, based on the total weight of the copolymer.

According to a third aspect, the present disclosure relates to a material comprising the polypropylene-asphaltene composite. The composites are more thermally stable and have improved mechanical properties, especially tensile strength, compared to polypropylene (refer to Table 5 in Example 5). Therefore, the material may be employed in manufacturing rigid packaging such as crates, boxes, bottles and bottle caps. The composite may be spun to form fibers for use in tape, strapping, spunbound textiles, bulk continuous filament and staple fibers for carpet manufacture. Preferably, melt spinning is employed.

The present embodiments are being described with reference to specific example embodiments and are included to illustrate but not limit the scope of the disclosure or the claims.

EXAMPLE 1

Separation of Asphaltenes from Arabian Heavy Crude Oil 7.0 g of heavy residue was added to a 200 mL beaker and warmed with a minimal amount of n-heptane to homogenize the sample. The resulting mixture was then carefully transferred to a 2 L Erlenmeyer flask containing 700 mL of n-heptane. The flask was fitted with mechanical stirrer and heated in a water bath at 90° C. and stirred vigorously for 2 hrs in order to maximize the solubility of residue, and then cooled at room temperature for about 24 hrs. The long cooling time produces more efficient precipitation of asphaltenes. The whole content was then filtered with 0.8 μm Millipore filter. All insoluble material was extracted with toluene using the soxhlet apparatus and filtered again using same filtering apparatus. The insoluble material was removed as sludge (coke) and soluble material, asphaltenes, was recovered after evaporating toluene completely. In order to remove any traces of maltenes, the recovered asphaltenes were washed several times with small portions of n-heptane until the washing became colourless and then dried in an oven at 105° C. until constant weight was obtained.

The asphaltenes used in this study were isolated as n-heptane insoluble materials from the Arab heavy Saudi Arabian crude oils. Arabian Heavy is a relatively low-gravity (27.9° API), high-sulphur, paraffinic wax-containing crude oil. Table 1 shows the characteristic properties for Arab heavy asphaltenes, which have a molecular weight of 1866 determined by gel permeation chromatography (Ali, M. F., Siddiqui, M. N. and Al-Hajji A. A. Structural Studies on Residual Fuel Oil Asphaltenes by RICO Method, Petroleum Science & Technology, 22(5&6) (2004) 631-645, incorporated herein by reference in its entirety). More detailed characterization can be found in literature (M. N. Siddiqui. Catalytic pyrolysis of Arab Heavy residue and effects on the chemistry of asphaltene. J. Anal. Appl. Pyrolysis. 89 (2010) 278-285, incorporated herein by reference in its entirety).

TABLE 1

Composition of asphaltenes derived from Arabian Heavy crude oil.

| Element | Amount |
|---|---|
| C (%) | 83.22 ($C_{aromatic}$ 36.0%, $C_{aliphatic}$ 64.0%) |
| H (%) | 8.25 ($H_{aromatic}$ 8.1%, $H_{aliphatic}$ 91.9%) |
| Ni (ppm) | 19 |
| V (ppm) | 60 |

EXAMPLE 2

Preparation of Polypropylene-asphaltene Composites

Polypropylene was melt blended with different weight percentages of asphaltenes as filler using a Brabender plasticoder at 190° C. for 10 min at a rotor speed of 60 rpm. The polymer was first melted for two minutes. In the next two minutes, the filler was added into the molten polymer. After complete addition of the filler, the mixing was continued for another six minutes. During the mixing, the temperature and torque were consistent. The blended mixtures were then hot pressed at 200° C. under a pressure of 9 MPa using Carver hot-press. The samples were kept on the hot stage for 5 minutes. Then it was cooled for 10 more minutes. The sample code of each composite appears in Table 2.

TABLE 2

Relative amounts of polypropylene (PP) and asphaltenes and code number of each composite studied

| Sample | PP:Asphaltenes (wt %) |
|---|---|
| PP | 100:0 |
| PPA1 | 97.5:2.5 |
| PPA2 | 95:5 |
| PPA3 | 92.5:7.5 |
| PPA4 | 90:10 |
| PPA5 | 85:15 |

EXAMPLE 3

Fourier Transform Infra-red (FTIR) Spectroscopy

For the characterization of the chemical structure of the pristine polypropylene and its composites, FTIR spectroscopy was used. The instrument used was an FTIR spectrophotometer of Perkin-Elmer, Spectrum One. The resolution of the equipment was 4 $cm^{-1}$ and the recorded wavenumber range was from 450 to 4000 $cm^{-1}$ and 32 spectra were averaged to reduce the noise.

FTIR spectroscopy was employed to observe any changes and chemical interactions between the filler and the polymeric matrix. The FTIR spectra of all samples appear in FIG. 1. In all materials, the absorbances of the characteristic peaks of polypropylene at 841 $cm^{-1}$ (—$CH_2$ rocking and the C—$CH_3$ stretching vibrations), at 900 $cm^{-1}$ (—$CH_3$ and —$CH_2$ rocking and the —CH bending vibrations), at 1358 and 1377 $cm^{-1}$ (bending vibrations of asymmetric methyl groups) and at 1458 $cm^{-1}$ (bending vibrations of symmetric methylene groups) have higher intensities. The small peak at 2722 $cm^{-1}$ corresponds to the absorbance of the methyl group of polypropylene and the intense peaks at 2838 and 2921 $cm^{-1}$ are attributed to the stretching of —C—H bonds and the peak at 2870 $cm^{-1}$ is the characteristic peak of —$CH_3$ for polypropylene. In the composites almost the same spectra were recorded, since the same characteristic chemical groups appear in the asphaltenes as in polypropylene and they are mainly C—H bonds in either —$CH_2$ or —$CH_3$. No characteristic peaks for C=O stretch absorption at 1698 or 1704 $cm^{-1}$ were recorded.

EXAMPLE 4

Differential Scanning Calorimetry (DSC)

Thermal properties of the composites were measured using DSC. The instrument used was the DSC-Diamond from Perkin-Elmer. The sample mass was approximately 5.5 mg in all measurements. The experimental conditions of the measurements included the following steps: (i) heat from 30° C. to 190° C. at 20° C./min, (ii) hold at 190° C. for 2 min, (iii) cool from 190 to −40° C. at 20° C./min, (iv) hold at −40° C. for 2 min, (v) heat from −40 to 190 at 20° C./min. All melting temperature results are obtained from the second heating step to eliminate thermal history of the sample. Crystallization was recorded during cooling from the melt.

Figure 2:
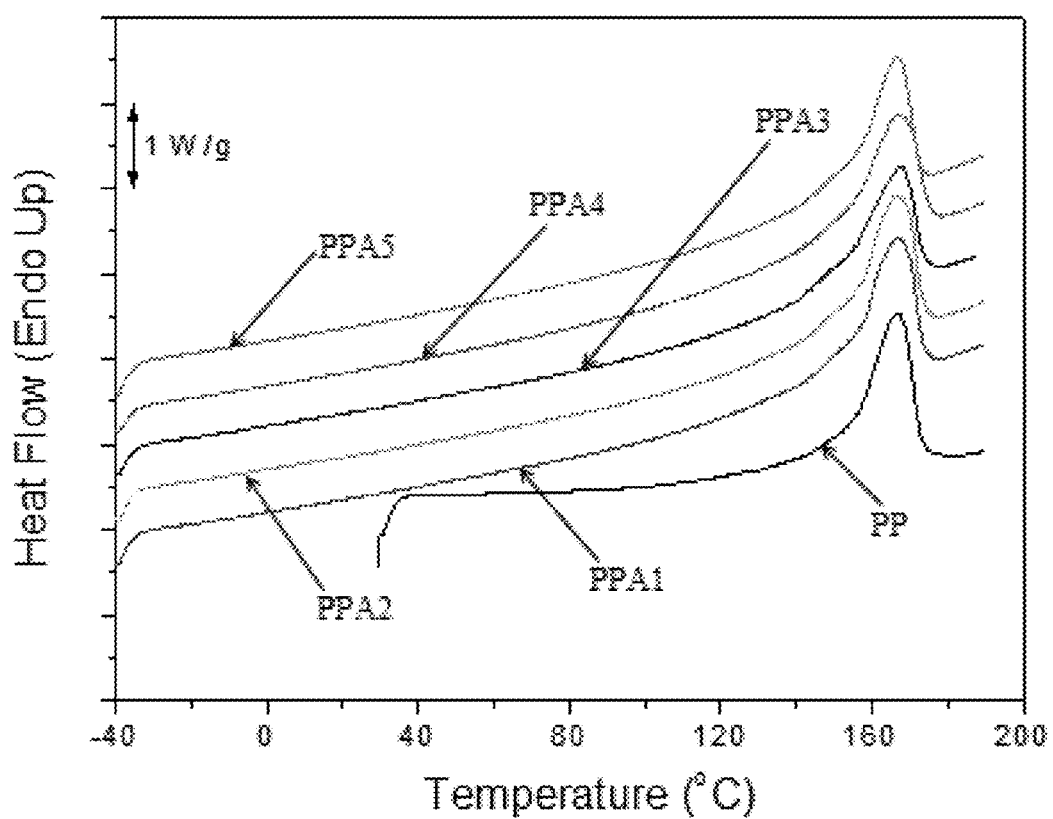
FIG. 2 shows an overlay of the DSC scans of pristine polypropylene and the composites.

In order to study the melting behavior of pristine polypropylene and all its composite materials, DSC thermograms were recorded and results obtained during the second heating appear in FIG. 2. The melting peak temperatures and the total heat of fusion obtained from these curves are reported in Table 3. As it can be seen, all curves are similar and all samples melt at approximately the same temperature i.e. that of 166.6° C., except of PPA3 where a slightly higher value was measured. In addition, $\Delta H_m$ of this sample was lower compared to all the others.

TABLE 3

Results from DSC measurements, $T_m$ melting peak temperature, $T_c$ crystallization peak temperature, $\Delta H_m$ total heat of melting, $\Delta H_c$ total heat released during crystallization, $X_c$ degree of crystallinity and $X_{c,cor}$ corrected degree of crystallinity.

| Sample | $T_m$ (° C.) | $\Delta H_m$ (J/g) | $T_c$ (° C.) | $\Delta H_{cryst}$ (J/g) | Xc (%) | $X_{c,cor}$ (%) |
|---|---|---|---|---|---|---|
| PP | 166.6 | 74.8 | 109.0 | 94.3 | 35.1 | 35.1 |
| PPA1 | 166.6 | 77.1 | 110.5 | 83.5 | 36.2 | 37.1 |
| PPA2 | 166.6 | 78.0 | 111.5 | 83.0 | 36.6 | 38.5 |
| PPA3 | 167.3 | 68.7 | 111.2 | 73.4 | 32.2 | 34.9 |
| PPA4 | 166.9 | 70.6 | 112.2 | 77.9 | 33.1 | 36.8 |
| PPA5 | 166.6 | 67.0 | 112.5 | 71.1 | 31.4 | 37.0 |

Figure 3:
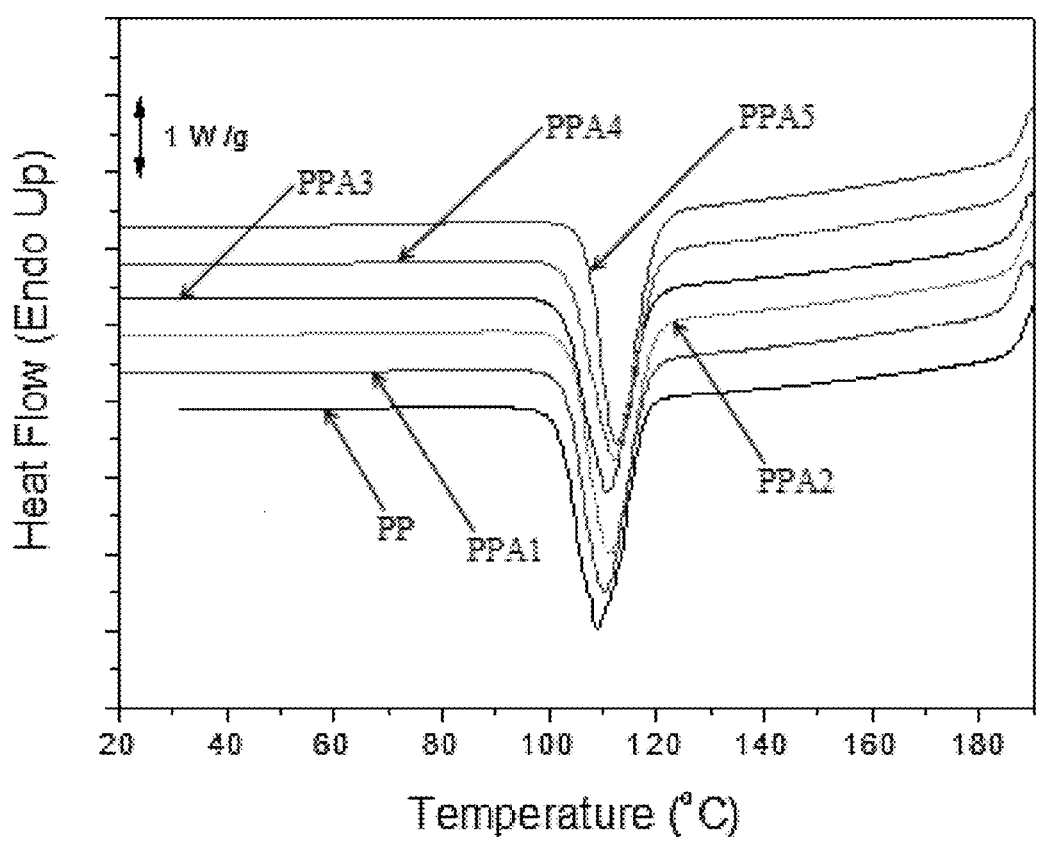
FIG. 3 shows an overlay of the DSC thermograms of pristine polypropylene and the composites.

The peak crystallization temperature of the samples was also recorded during a cooling step. Results appear in FIG. 3 and Table 3. It is seen that the crystallization peak temperature is slightly shifted to higher values with the amount of asphaltenes added. This means that asphaltenes have a slight nucleating effect on polypropylene crystallization. Moreover, the lower melting enthalpy measured for the PPA3 sample was also reflected in lower total heat released during crystallization from this sample and because of lower crystallinity of the whole composite. However, if the relative amount of the polymer in the composite is taken into consideration, the following equation providing the corrected degree of crystallinity, $X_{c,cor}$ of each composite can be derived as $$X_{c,cor} = \frac{\Delta H_m}{\Delta H_m^0 w} 100$$

Where, $\Delta H_m$ is the heat of fusion of polypropylene and its composites, $\Delta H_m°$ is the heat of fusion for 100% crystalline polypropylene taken equal to 213 J/g and w is the weight fraction of polypropylene in the composites.

From the corrected degree of crystallinity values reported in Table 3, it seems that PPA3 composite has almost the same crystallinity with pristine polypropylene, while all other composites have higher values. Therefore, it seems that the addition of asphaltenes in polypropylene is beneficial to the crystallization of polypropylene, resulting in increased crystalline domains and demonstrating the nucleating efficiency of asphaltenes producing composites with increased polymer crystallinity. Higher relative crystallinity was estimated with the PPA2 sample.

EXAMPLE 5

Thermogravimetric Analysis (TGA)

For the determination of the thermal stability of the composites TG analysis was performed on a Pyris 1 TGA (Perkin Elmer) thermal analyzer equipped with a sample pan made of Pt. Samples of about 5-8 mg were used. They were heated from ambient temperature to 600° C. at a heating rate 10° C./min, under a 20 ml/min nitrogen flow. The same procedure was also used for pristine asphaltenes.

Figure 10:
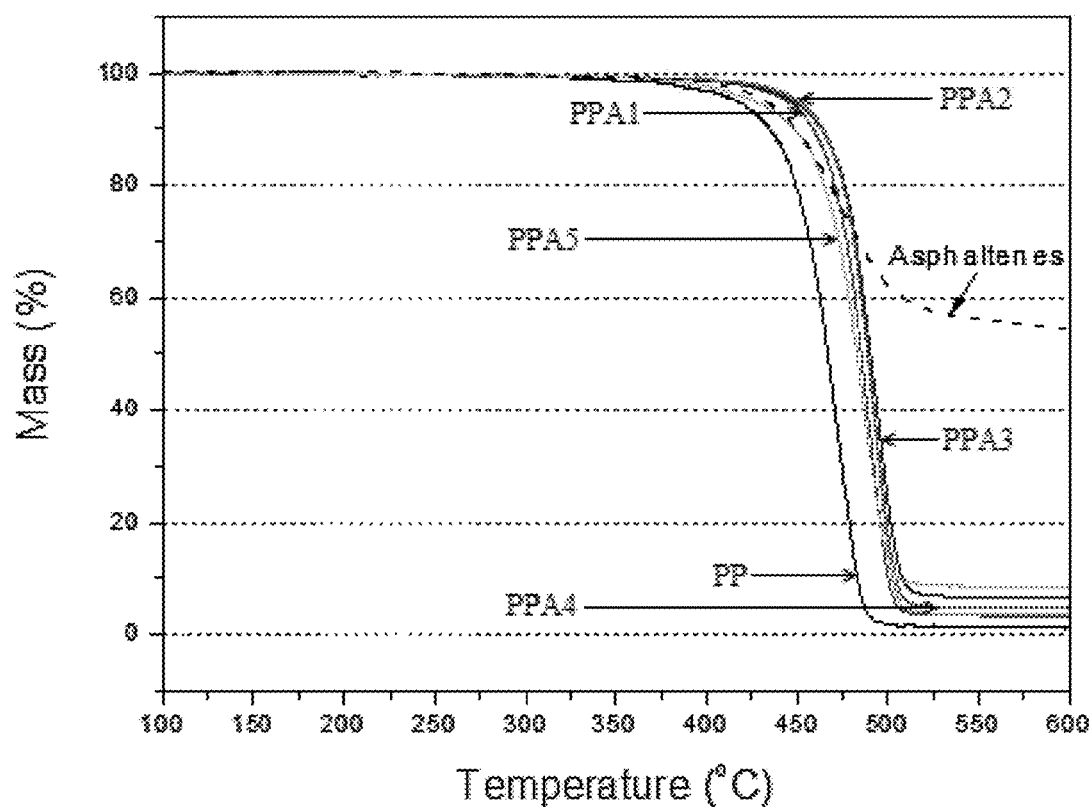
FIG. 10 shows an overlay of thermal degradation curves of pristine polypropylene, the composites and asphaltenes, which were heated at 10° C./min.
Figure 11:
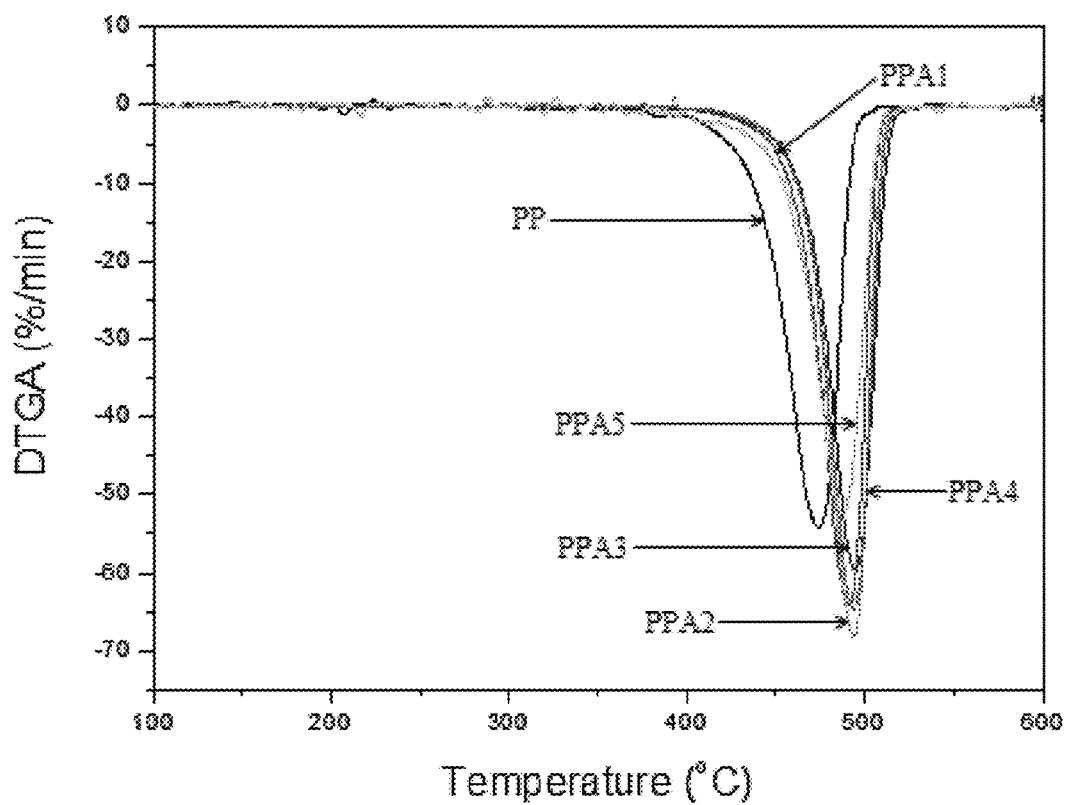
FIG. 11 shows an overlay of thermal degradation curves of the composites, which were heated at 10° C./min.

Thermal stability of neat polypropylene and its composites with different amounts of asphaltenes appears in FIG. 10. The corresponding differential TG curves appear in FIG. 11. As it can be seen, all samples degraded completely within one step. Polypropylene thermally degrades to volatile products leaving a residue of around 1.2% at 600° C. through a radical chain process, whose onset ($T_2\%$) and maximum weight loss rate temperature ($T_p$) are around 380° C. and 474° C., respectively. These data are in good agreement with corresponding literature data (G. Tartaglione, D. Tabuani, G. Camino, M. Moisio. PP and PBT composites filled with sepiolite: Morphology and thermal behaviour. Compos. Sci. Technol. 68 (2008) 451-460, incorporated herein by reference in its entirety). The initial decomposition temperatures of all composites are shifted to higher temperatures compared to pristine polypropylene ($T_{2\%}$ in Table 4), indicating that the presence of asphaltenes improves the thermal stability of polypropylene composites. The asphaltenes might have formed a protective layer (thermal shield) around the polymer that delayed the degradation induced by heat and acted as a thermal barrier limiting the emission of the gaseous degradation products, resulting in an increase in the thermal stability of the material.

FIG. 10 shows the thermal degradation curve of pristine asphaltenes. It starts degrading near 400° C., which is hotter than the starting point of degradation of polypropylene (i.e. near 380° C.). A residue of near 55% was observed at 600° C.

TABLE 4

Temperature where thermal degradation starts ($T_{2\%}$), at 50% conversion ($T_{50\%}$) and at the degradation peak ($T_p$) as well as residue at 600° C. of pristine PP and PP/asphaltenes composites.

| Sample | $T_{2\%}$ | $T_{50\%}$ | $T_p$ | Residue at 600° C. (%) |
|---|---|---|---|---|
| PP | 380.4 | 467.1 | 473.8 | 1.2 |
| PPA1 | 416.6 | 485.5 | 490.6 | 3.1 |
| PPA2 | 427.0 | 488.6 | 493.4 | 3.5 |
| PPA3 | 426.3 | 490.6 | 494.7 | 6.5 |
| PPA4 | 424.2 | 489.2 | 493.6 | 4.8 |
| PPA5 | 393.7 | 482.9 | 487.5 | 8.3 |

EXAMPLE 6

X-ray Diffraction (XRD)

X-ray diffraction (XRD) patterns of polypropylene and its composites were obtained from an XRD-diffractometer (model Richard Seifert 3003 TT, Ahrensburg, Germany) with a CuKa radiation for crystalline phase identification ($\lambda=0.15405$ nm for CuKa). The scanning range, 2θ, of the samples was from 5 to 35°, at steps of 0.05 and counting time of 5s.

Figure 4:
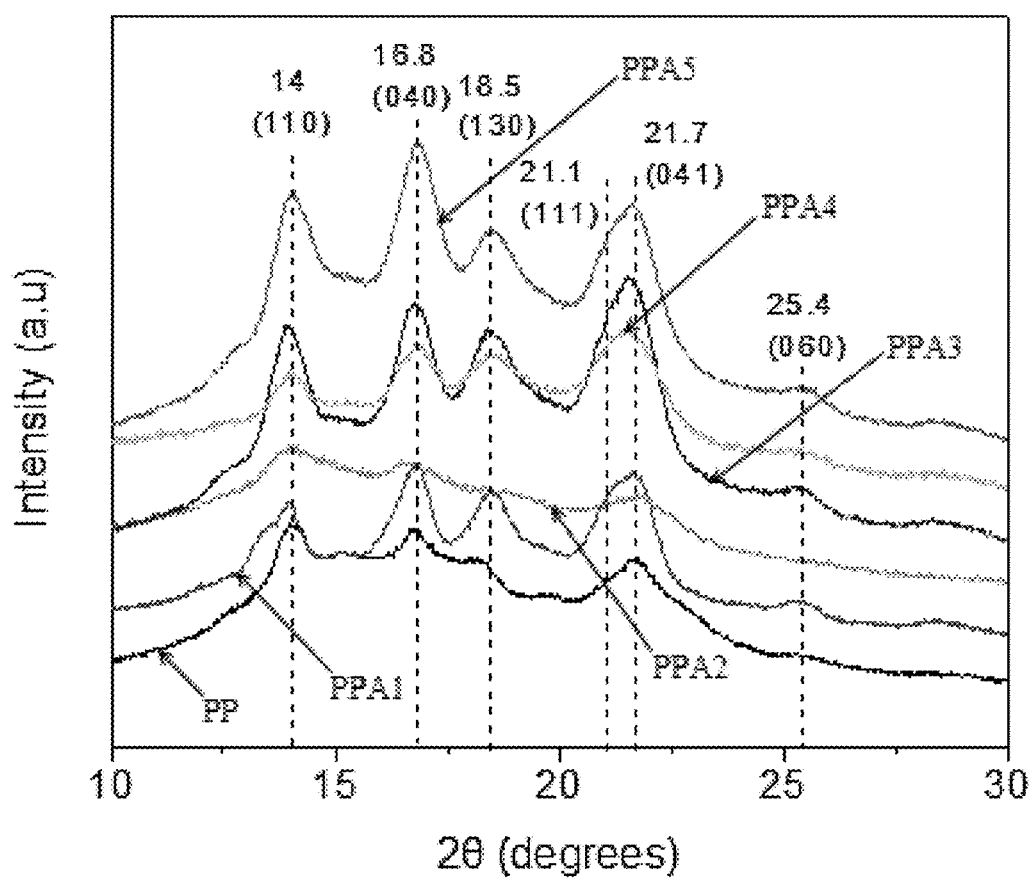
FIG. 4 shows an overlay of the XRD spectra of pristine polypropylene and the composites.
Figure 5:
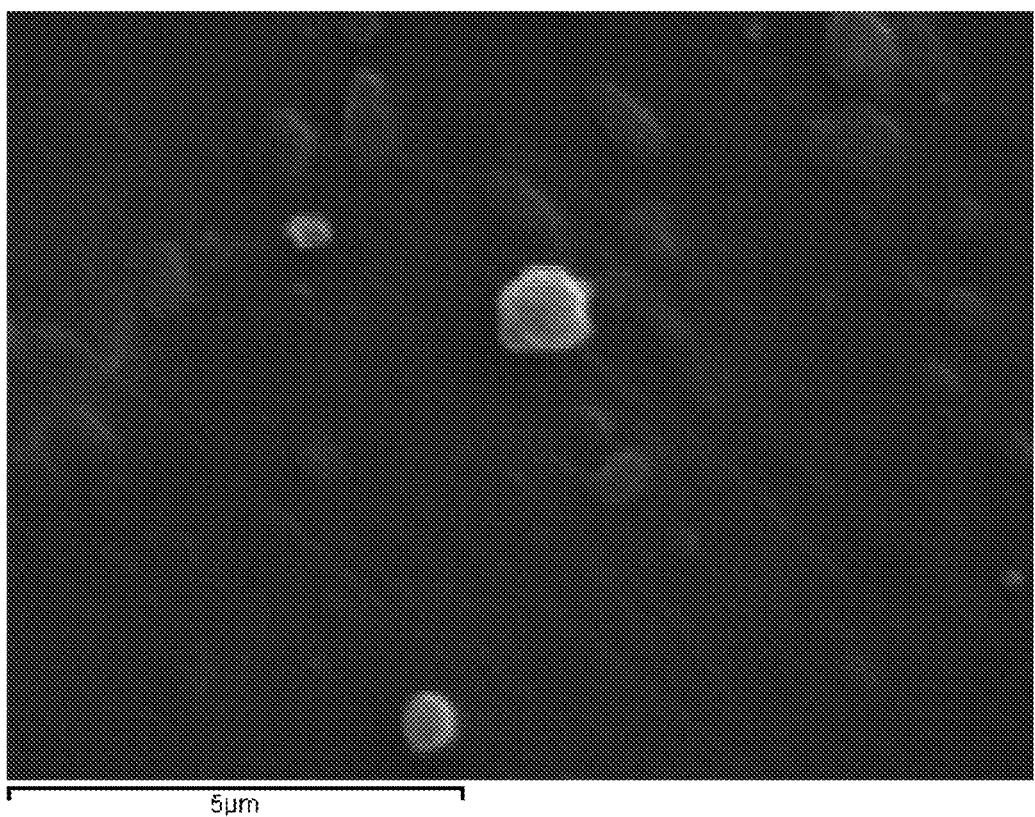
FIG. 5 shows a SEM image of the composite PPA1.
Figure 6:
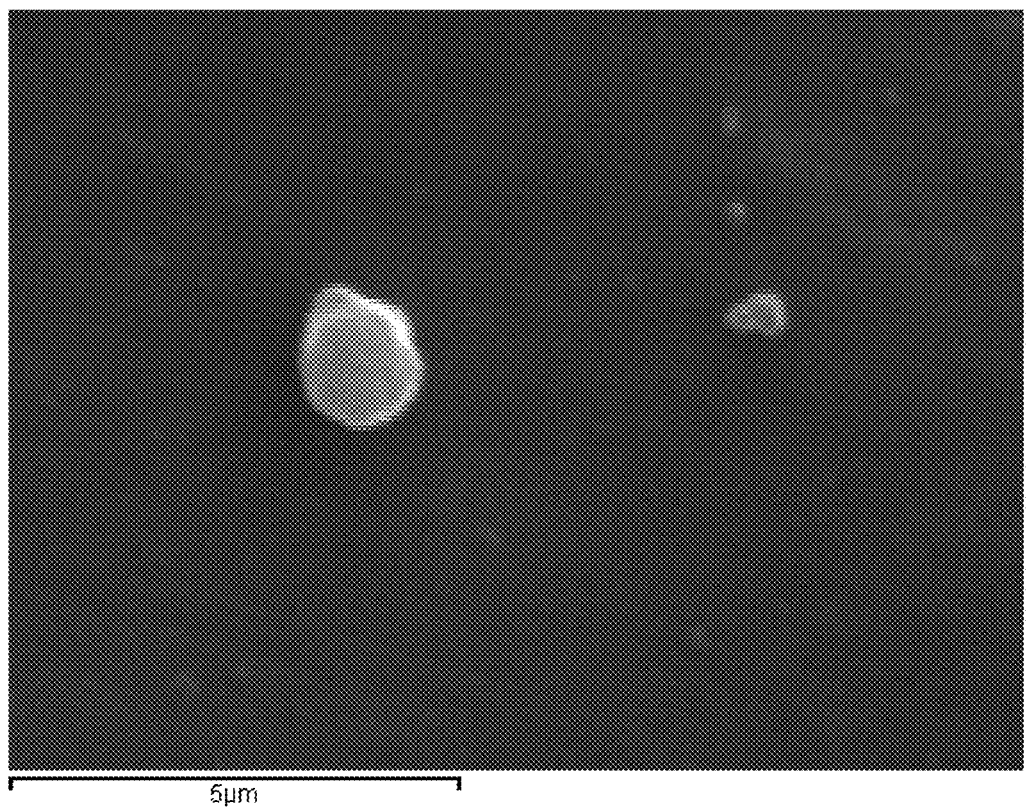
FIG. 6 shows a SEM image of the composite PPA2.
Figure 7:
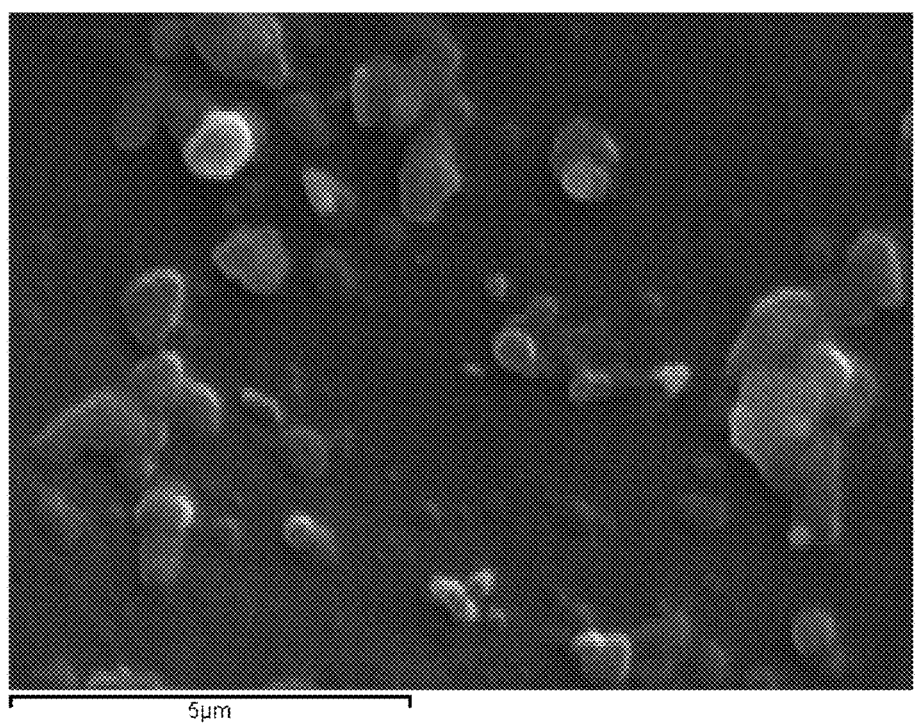
FIG. 7 shows a SEM image of the composite PPA3.
Figure 8:
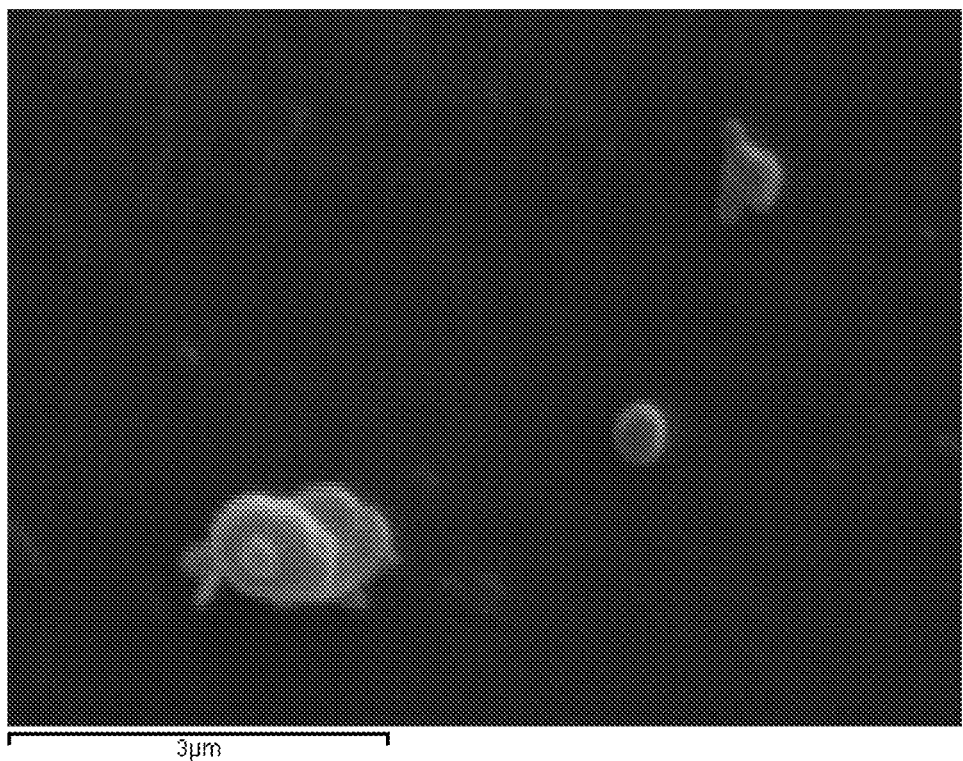
FIG. 8 shows a SEM image of the composite PPA4.
Figure 9:
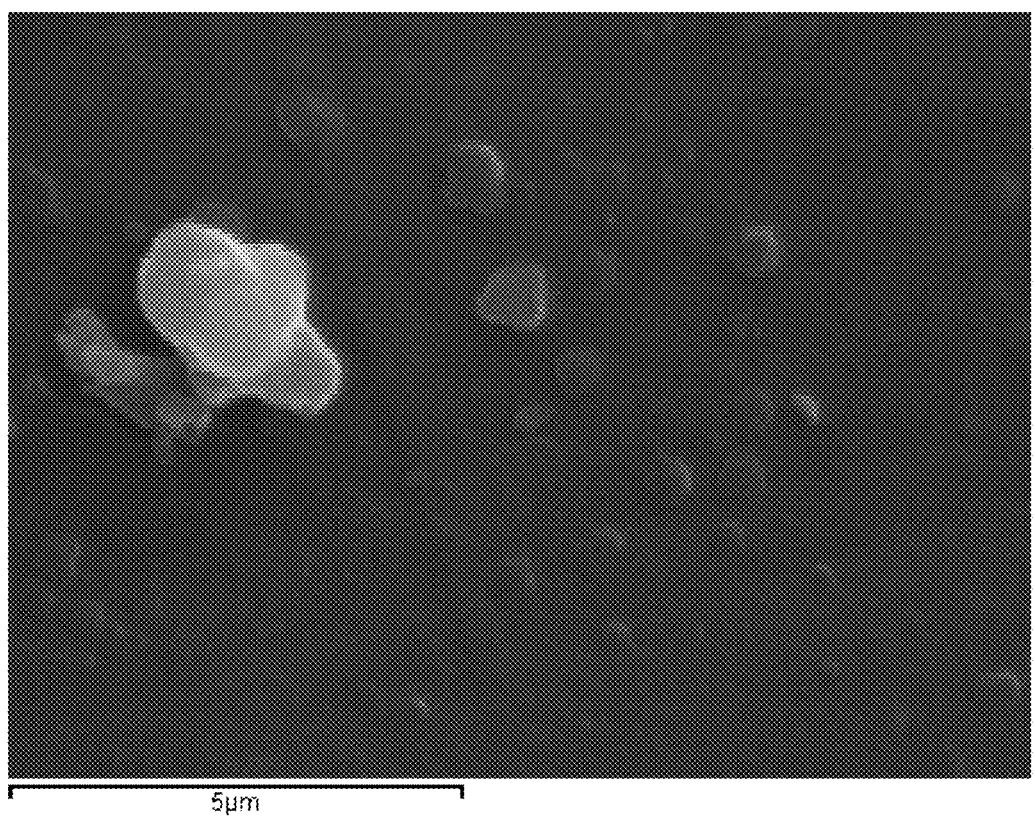
FIG. 9 shows a SEM image of the composite PPA5.

FIG. 4 shows XRD patterns of pristine polypropylene and its composites. Both, polypropylene and its composites show the typical XRD diffractogram of the monoclinic α phase of polypropylene (S. H. Han et al. Compos. Sci. Technol. 91 (2014) 55-62, incorporated herein by reference in its entirety). The characteristic diffraction peaks at 2θ: 14° (110), 16.8° (040), 18.5° (130), 21.1 (111) and 21.7° (041) are clear. A small peak at 25.4° (060) was also measured. No β-nucleating agents were observed, from the non-existence of the corresponding peak at 16°. The composites crystallize with the same phase of the pristine polymer with however there is a significant variation of the intensity of the peaks between pristine polypropylene and the composites. The crystallinity and crystal structure of the composites were nearly identical regardless of the amount of asphaltenes, mainly because no side reactions occurred during melt mixing.

EXAMPLE 7

Scanning Electron Microscopy

Scanning electron microscopy (SEM) images were also taken with accelerating voltage of 15.00 kV (model Zeiss Supra 55 VP, Jena, Germany).

The SEM images of all composites appear in FIGS. 5-9. Larger agglomerates were observed with increased asphaltene content in samples PPA4 and PPA5. The size of aggregates is less than 1 μm when 2.5 wt % asphaltenes was used.

EXAMPLE 8

Tensile Mechanical Properties

The tensile mechanical properties were studied on relatively thin films of the polymer or composites. Dumbbell-shaped tensile-test specimens (central portions, 5×0.5 mm thick, gauge length 22 mm) were cut from the sheets in a Wallace cutting press and conditioned at 23° C. and 55-60% relative humidity for 48 h. The stress-strain data were obtained with an Instron model BlueHill 2 tensile-testing machine, which was maintained under the same conditions and operated at an extension rate of 5 mm/min. The values of the yield stress, tensile strength, and elongation at break were determined according to ASTM D 1708-66. At least five specimens were tested for each sample, and the average values are reported.

Figure 12:
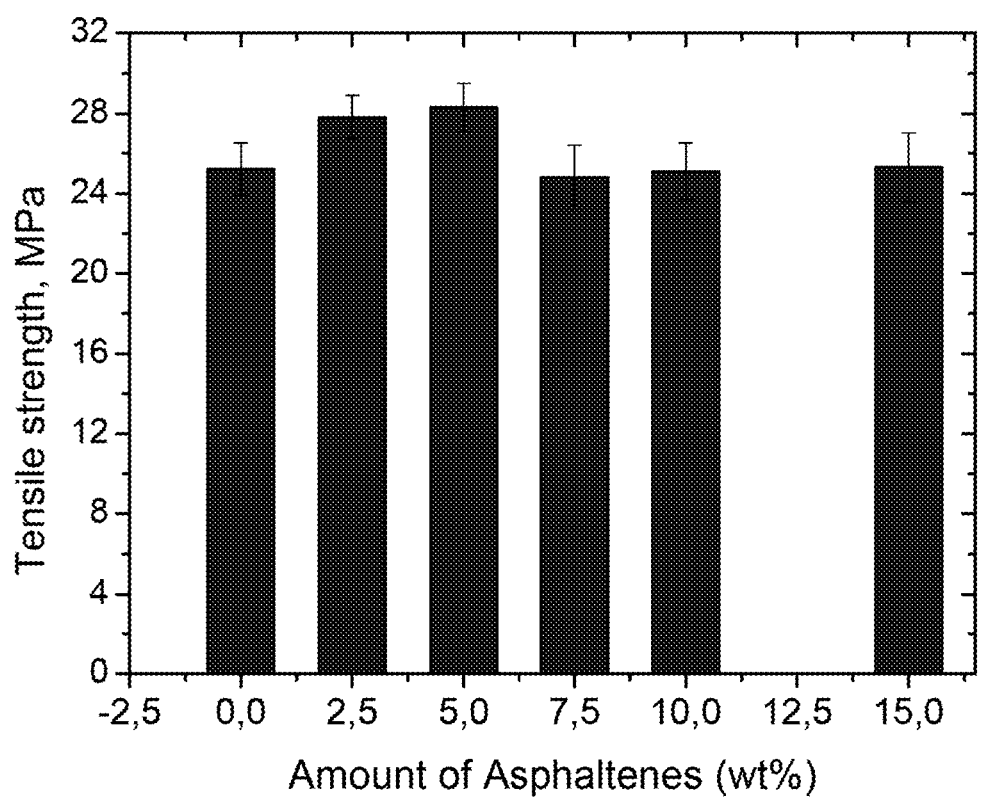
FIG. 12 shows the variation of tensile strength with the amount of asphaltenes in the composites.

Tensile mechanical properties of polypropylene and composites are illustrated in Table 5 and FIG. 12. The values measured for pristine polypropylene are similar to those reported in literature (D. S. Achilias, A. Giannoulis, G. Z. Papageorgiou. Recycling of polymers from plastic packaging materials using the dissolution-reprecipitation technique. Polym. Bull. 63 (2009) 449-465; D. S. Achilias, C. Roupakias, P. Megalokonomos, A. A. Lappas, E. V. Antonakou. Chemical recycling of plastic wastes made from polyethylene (LDPE, HDPE) and polypropylene (PP). J Hazard Mater 149(3) (2007) 536-542, each incorporated herein by reference in their entirety).

TABLE 5

Tensile mechanical properties of pristine PP and its composites with asphaltenes.

| Sample | Tensile strength (MPa) | Elongation at break (%) | Tensile stress at yield (MPa) | Elastic Modulus (MPa) |
|---|---|---|---|---|
| PP | 25.2 ± 1.3 | 602 ± 23 | 23.0 ± 0.6 | 626 ± 34 |
| PPA1 | 27.8 ± 1.1 | 618 ± 27 | 24.9 ± 0.9 | 637 ± 42 |
| PPA2 | 28.3 ± 1.2 | 634 ± 32 | 25.5 ± 1.1 | 656 ± 54 |
| PPA3 | 24.8 ± 1.6 | 521 ± 51 | 22.3 ± 1.4 | 582 ± 61 |
| PPA4 | 25.1 ± 1.4 | 571 ± 49 | 22.9 ± 1.3 | 591 ± 55 |
| PPA5 | 25.3 ± 1.7 | 584 ± 45 | 22.7 ± 1.2 | 645 ± 65 |

The FTIR and XRD data supports the observation that the presence of asphaltenes does not alter the chemical characteristics and the crystalline state of polypropylene. However, the addition of asphaltenes significantly increased the thermal stability of polypropylene. DSC measurements showed that although the melting temperature is almost the same, the crystallization peak is shifted to higher values resulting in a measurable improvement in the relative degree of crystallinity denoting thus the nucleating effect of the additive in the polymeric matrix. The mechanical tensile properties studied showed that the addition of asphaltenes improves tensile strength.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A polypropylene-asphaltene composite, comprising:
a polypropylene polymer in an amount ranging from 85-98 wt %, and
a filler in an amount ranging from 2 wt % to less than 10 wt %, wherein the filler is an asphaltene and the asphaltene is the only filler present,
wherein the weight percentages are based on a total weight of the composite.

2. The composite of claim 1, consisting essentially of:
the polypropylene polymer in an amount ranging from about 90-98 wt %, and
the filler in an amount ranging from 2 wt % to less than 10 wt %, wherein the filler is an asphaltene and the asphaltene is the only filler present,
wherein the weight percentages are based on a total weight of the composite.

3. The composite of claim 1, consisting of:
the polypropylene polymer in an amount ranging from about 90-98 wt %, and
the filler in an amount ranging from 2 wt % to less than 10 wt %, wherein the filler is an asphaltene and the asphaltene is the only filler present,
wherein the weight percentages are based on a total weight of the composite.

4. The composite of claim 1, wherein asphaltene is present in an amount ranging from 2 wt % to 7.5 wt % of the total weight of the composite.

5. The composite of claim 1, wherein asphaltene is present in an amount ranging from 2 wt % to 5 wt % of the total weight of the composite.

6. The composite of claim 1, wherein the composite is in the form of a particle with a largest average diameter ranging from 0.5-5 μm.

7. The composite of claim 1, which has a peak melting temperature in a range of 165-175° C. and a degree of crystallinity in a range of more than 35% to 40%.

8. The composite of claim 1, wherein the composite has a tensile strength ranging from 22-30 MPa.

9. The composite of claim 1, wherein the composite has an elastic modulus ranging from 520-710 MPa.

10. The composite of claim 1, wherein the asphaltene is extracted from Arabian Heavy crude oil.

11. The composite of claim 1, wherein the asphaltene comprises carbon atoms in an amount ranging from 83-84 wt %, hydrogen atoms in an amount ranging from 8.2-8.4 wt %, nickel in an amount ranging from 18-20 ppm and vanadium in an amount ranging from 59-61 ppm, where the weight percentages and ppm levels are based on a total weight of the asphaltene, and the asphaltene has an average molecular weight in a range of 1800-1900 Daltons.

12. A method of preparing the polypropylene-asphaltene composite of claim 1, comprising:
melting a polypropylene polymer to obtain a molten polymer,
blending the molten polymer with a filler to obtain a blended mixture, and
hot pressing the blended mixture to obtain the composite,
wherein the polypropylene polymer is present in an amount ranging from 85-98 wt %, the filler is present in an amount ranging from 2 wt % to less than 10 wt %, the weight percentages are based on a total weight of the composite, and the filler is an asphaltene, which is the only filler present.

13. The method of claim 12, wherein the blending is performed at a rotor speed of 50 to 100 rpm and at a temperature ranging from 180-210° C.

14. The method of claim 12, wherein the hot pressing is performed at a temperature ranging from 180-210° C. and a pressure ranging from 8-20 MPa.

15. The method of claim 12, wherein the composite is in the form of a particle with a largest average diameter ranging from 0.5-5 μm.

16. The method of claim 12, wherein asphaltene is present in an amount ranging from 2 wt % to less than 10 wt % of the total weight of the composite.

17. The method of claim 12, wherein the asphaltene is derived from Arabian Heavy crude oil.

18. A material comprising a polypropylene-asphaltene composite, wherein the material is employed in a packaging material, a textile or both, and the polypropylene-asphaltene composite comprises:
a polypropylene polymer in an amount ranging from 85-98 wt %, and
a filler in an amount ranging from 2 wt % to less than 10 wt %, wherein the filler is an asphaltene and the asphaltene is the only filler present,
wherein the weight percentages are based on a total weight of the composite.

* * * * *